United States Patent
Mizikovsky et al.

(10) Patent No.: US 7,596,225 B2
(45) Date of Patent: Sep. 29, 2009

(54) METHOD FOR REFRESHING A PAIRWISE MASTER KEY

(75) Inventors: Semyon B. Mizikovsky, Morganville, NJ (US); Robert J. Rance, Andover, MA (US)

(73) Assignee: Alcatl-Lucent USA Inc., Murray Hill, NJ (US)

( * ) Notice: Subject to any disclaimer, the term of this patent is extended or adjusted under 35 U.S.C. 154(b) by 833 days.

(21) Appl. No.: 11/173,143

(22) Filed: Jun. 30, 2005

(65) Prior Publication Data

US 2007/0005972 A1    Jan. 4, 2007

(51) Int. Cl.
*H04L 9/00* (2006.01)
*H04K 1/00* (2006.01)

(52) U.S. Cl. .................. 380/273; 380/270; 380/259

(58) Field of Classification Search .......... 380/273, 380/270, 259
See application file for complete search history.

(56) References Cited

OTHER PUBLICATIONS

A secure group communication using non-interactive key computation in multiparty key agreement Kalaiselvi, S.; Begum, S.J.; Computing, Communication and Networking, 2008. ICCCn 2008. International Conference on Dec. 18-20, 2008 pp. 1-6.*

The KryptoKnight family of light-weight protocols for authentication and key distribution Bird, R.; Gopal, I.; Herzberg, A.; Janson, P.; Kutten, S.; Molva, R.; Yung, M.; Networking, IEEE/ACM Transactions on vol. 3, Issue 1, Feb. 1995 pp. 31-41.*
Communications Link Layer Security; Kwei Tu; Communication Technology, 2006. ICCT '06. International Conference on Nov. 27-30, 2006 pp. 1-4.*
International PCT/US3006/024254 Search Report dated Nov. 9, 2006.
Feng et al., "Reauthorization via PKM extensible authentication protocol" IEEE 802.16 Broadband Wireless Access Working Group, XP002404488 dated Jan. 21, 2005.
Altunbasak et al., "Alternative Pair-wise Key Exchange Protocols for Robust Security Networks (IEEE 802.11i) in Wireless LANs" Southeastcon 2004 Proceedings, IEEE Greensboror, North Carolina, pp. 77-83 X010697814; 2004.
Mizikovsky et al., "PMK Refresh" IEEE 802.16 Broadband Wireless Access Working Group, XP002404489; Jul. 18, 2005.
Aboba et al., "Extensible Authentication Protocol (EAP) Key Management Framework" IETF Standard-Working-Draft, Internet Engineering Task Force, IETF, XP015018065, Feb. 18, 2005.

* cited by examiner

*Primary Examiner*—David Y Jung

(57) ABSTRACT

The present invention provides a method for communication involving a supplicant, an authenticator, and an authentication server having an established security association based on a first key. The supplicant and the authenticator also have an established security association based on a second key. The method may include modifying the second key using the first key in response to determining that a challenge response from the supplicant is valid.

16 Claims, 2 Drawing Sheets

METHOD FOR REFRESHING A PAIRWISE MASTER KEY

BACKGROUND OF THE INVENTION

1. Field of the Invention

This invention relates generally to a communication system, and, more particularly, to a wireless communication system.

2. Description of the Related Art

Access points are used to provide wireless connectivity to one or more mobile units in a wireless communication system. Exemplary access points may include base stations, base station routers, Access Serving Networks (ASNs), WiMAX routers, and the like. Mobile units may include cellular telephones, personal data assistants, smart phones, text messaging devices, laptop computers, desktop computers, and the like. The access point also provides connectivity to one or more outside networks. For example, in a wireless network that operates according to an IEEE 802.16 protocol, a mobile unit may establish a wireless connection with a WiMAX router, which may include one or more Access Serving Network (ASN) entities and one or more base stations. The WiMAX router may be connected to one or more Connectivity Serving Networks (CSN) that provide connectivity to an outside network.

Security associations may be established and maintained to allow secure communications between mobile units and the serving network. For example, systems that operate according to the IEEE 802.16e and/or WiMAX standards may use the privacy and key management, version 2, (PKMv2) protocol with Extensible Authentication Protocol (EAP) for user authentication and device authorization. The PKMv2 protocol supports device authorization and user authentication between a mobile unit and a home Network Service Provider (NSP) using a 3-party scheme.

The three parties in the PKMv2 protocol are the supplicant, the authenticator, and the authentication server. A supplicant is an entity at one end of a point-to-point link that is being authenticated by an authenticator attached to the other end of that link. An authenticator is an entity at one end of a point-to-point link that facilitates authentication of supplicants that may be attached to the other end of the point-to-point link. The authenticator enforces authentication before allowing the supplicant access to services in the network. An authentication server is an entity that provides an authentication service to an authenticator. This authentication server uses the credentials provided by the supplicant to determine whether the supplicant is authorized to access the services provided via the authenticator. For example, in a WiMAX system, the supplicant is the mobile unit, the authenticator resides in the Access Serving Network (ASN), and the authentication server is implemented in an authentication, authorization, and accounting (AAA) server in the Connectivity Serving Network (CSN).

The Extensible Authentication Protocol (EAP) is an encapsulation protocol used to transport packet data units (PDUs) that may be used to negotiate an authentication method between the supplicant and the authentication server. The Extensible Authentication Protocol may be encapsulated within other protocols such as the PKMv2 protocol, the 802.16 protocol, a RADIUS or DIAMETER protocol, a Universal Datagram Protocol (UDP), a Transmission Control Protocol (TCP), an Internet Protocol (IP), and the like. The RADIUS protocol and possibly the DIAMETER protocol are the de facto transport protocols for EAP over IP networks between the authenticator and authentication server. The Extensible Authentication Protocol (EAP) supports cryptographically strong key-deriving methods such as EAP-TLS, EAP-AKA and EAP-MSCHAPv2, as well as reuse of user credential types across WiMAX networks.

Secure connections are typically established according to a security model that specifies an operational relationship between the supplicant, the authenticator, and the authentication server. For example, a four-phase security model may be used. In the first phase, a supplicant (e.g., a mobile unit) discovers one or more available base stations that can provide wireless connectivity in a coverage area and selects a particular base station as a preferred (or serving) base station. The mobile unit then discovers configuration data, and the discovery may occur statically and/or dynamically. In the second phase, the supplicant presents its credentials to the authenticator, which forwards the supplicant's credentials to the authentication server. Depending on the authentication method being negotiated, multiple roundtrip communications between the various entities may be used. If the authentication procedure succeeds, the authentication server forwards a session-related key to the authenticator in the third phase. The authentication server also forwards information that may be used to generate the session-related key to the supplicant. The session-related keys held by the authenticator and the supplicant are used to establish a security association manifested by a pair of secret symmetric keys, which may be used to generate keys to protect data transmitted in the fourth phase.

In systems that operate according to the IEEE 802.16 and WiMAX standards, a symmetric key called the Master Key (MK) is pre-provisioned into the supplicant and the authentication server upon initialization of the supplicant's subscription. The Master Key represents the current subscription-based security association and only the supplicant and the authentication server can possess Master Key, which demonstrates authorization to make a decision on behalf of supplicant. An example of a Master Key is the root key used in authentication and key agreement (AKA) protocols. The supplicant and/or the authentication server can generate a Master Session Key (MSK) and/or an Extended Master Session Key (EMSK) from the Master Key. The Master Session Key is typically used for fixed subscribers and the Extended Master Session Key is typically used for mobile subscribers. These keys may be derived as recommended in section 7.10 of the IETF RFC-3748 "Extensible Authentication Protocol."

The supplicant and the authentication server may derive an AAA-key based on the Master Session Key (or the Extensible Master Session Key). The authentication server populates the AAA-Key into the corresponding authenticator using, for example, the RADIUS and/or DIAMETER protocols to establish a security association between the supplicant, the authenticator, and the authentication server. The supplicant and the authenticator each generate one of a pair of secret symmetric keys, which may be referred to as Pairwise Master Keys (PMKs), using the AAA-key. The IEEE 802.16 and WiMAX standards state that the supplicant and the authenticator derive the Pairwise Master Keys by truncating the AAA-key. Generation of the Pairwise Master Keys marks the successful completion of the Credential Verification and User Authentication phase, i.e. the second phase described above. The supplicant and the authenticator may each generate a copy of an Authorization Key (AK) using the Pairwise Master Key. Additional keys may be derived from the Authorization Key, as documented in the IEEE 802.16e draft standard.

Periodically refreshing the pair of secret symmetric keys that govern the security association between the supplicant and the authenticator may be useful. For example, the secret symmetric keys may expire after a predetermined key lifetime and thus it may be desirable to refresh the secret symmetric keys before they expire. Furthermore, the static linkage between the Pairwise Master Key and the Authorization Key requires that the Pairwise Master Key be erased when the Authorization Key is erased due to an 802.16e specified security operation. However, the only way to modify a Pairwise Master Key in the current IEEE 802.16e standard is to invoke the full three-party, four-phase authentication procedure described above.

The three-party, four-phase authentication procedure described above may consume a large amount of time and other system resources, at least in part because the authentication server in the subscriber's home network is to be accessed. Accordingly, a security association established between the supplicant and the authenticator (as expressed by a pair of secret symmetric keys) may be retained for a relatively long time. For example, the Pairwise Master Key used to define the security association between the mobile unit and the Access Serving Network may not be refreshed as long as the mobile unit stays within the boundary of the current Access Serving Network. Consequently, other keys derived from the pair of secret symmetric keys may not be refreshed. For example, the Access Key (AK) generated for a specific base station is typically defined as a function of the Pairwise Master Key (PMK), a Base Station Identifier (BS-ID), and a mobile unit identifier (MS-ID) and consequently will be set to the same value for as long as the Pairwise Master Key (PMK) remains the same.

However, maintaining a security association between the supplicant and the authenticator (as expressed by a pair of secret symmetric keys) for a relatively long time may increase security risks associated with the security association. Maintaining the secret symmetric keys for a relatively long period may also increase the probability of passive and active attacks on the relatively static values of the various keys, such as the Pairwise Master Key, the Authorization Key, and the like. For example, base stations in a less trusted security domain may use the values of keys such as the Pairwise Master Key and/or the Authorization Key to crypt-analyze the keys. The keys may then be used by an attacker to decrypt information associated with current and/or prior communication sessions.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for communication involving a supplicant, an authenticator, and an authentication server having an established security association based on a first key. The supplicant and the authenticator also have an established security association based on a second key. The method may include modifying the second key using the first key in response to determining that a challenge response from the supplicant is valid.

In another embodiment of the present invention, a method is provided for communication involving a supplicant, an authenticator, and an authentication server having an established security association based on a first key. The supplicant and the authenticator also have an established security association based on a second key. The method may include modifying the second key using the first key in response to determining that a challenge response from the authenticator is valid.

BRIEF DESCRIPTION OF THE DRAWINGS

The invention may be understood by reference to the following description taken in conjunction with the accompanying drawings, in which like reference numerals identify like elements, and in which.

Figure 1:
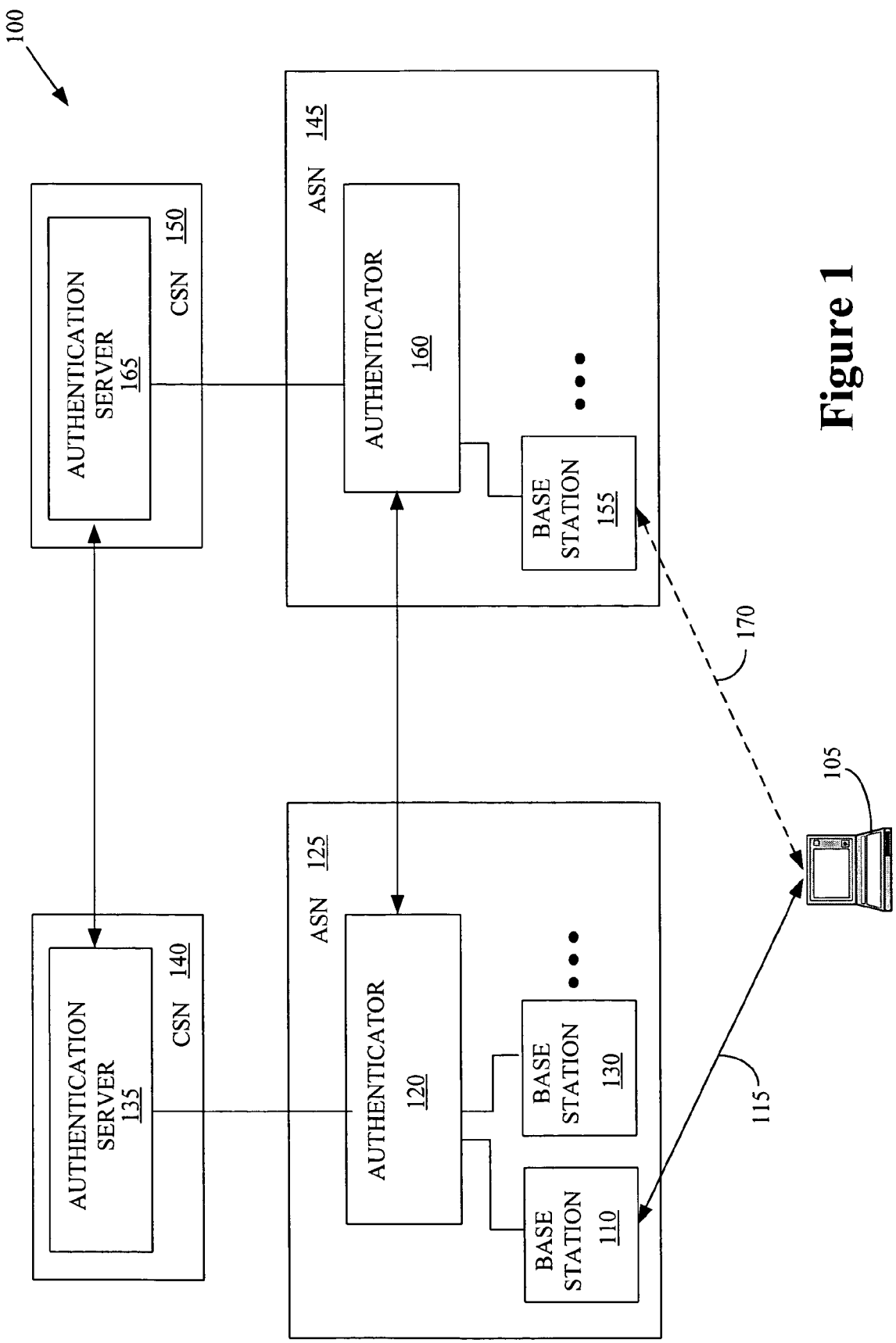
FIG. 1 conceptually illustrates one exemplary embodiment of a communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a communication system 100. In the illustrated embodiment, the communication system 100 includes a supplicant 105 that is in communication with a base station 110 via an air interface 115. Exemplary supplicants 105 include but are not limited to cellular telephones, personal data assistants, smart phones, text messaging devices, laptop computers, desktop computers, and the like. Although the base station 110 is shown in FIG. 1, persons of ordinary skill in the art should appreciate that any other type of access point may be used. In alternative embodiments, exemplary access points may include base station routers, Access Serving Networks (ASNs), WiMAX routers, and the like. The supplicant 105 and the base station 110 may communicate over the air interface 115 according to any protocol or combination of protocols. For example, the supplicant 105 and the base station 110 may communicate over the air interface 115 according to a Universal Mobile Telecommunication System (UMTS) protocol, a Global System for Mobile communication (GSM) protocol, a Code Division Multiple Access (CDMA, CDMA 2000) protocol, an IEEE 802.11 protocol, an IEEE 802.16 protocol, a Bluetooth protocol, and the like. Accordingly, only those aspects of the communication protocols that are relevant to the present invention will be discussed herein.

The base station 110 is communicatively coupled to an authenticator 120 that may be implemented in an access serving network (ASN) 125. In the illustrated embodiment, the access serving network 125 also includes a base station 130. However, persons of ordinary skill in the art having benefit of the present disclosure should appreciate that the access serving network 125 may include any number of base stations. Although FIG. 1 depicts the authenticator 120 and the base stations 110, 130 as functional elements within the access serving network 125, persons of ordinary skill in the art should also appreciate that the access serving network 125, the authenticator 120, and/or the base stations 110, 130 may be implemented in any number of physical devices.

The authenticator 120 is communicatively coupled to an authentication server 135 that is implemented in the connectivity serving network 140. In the illustrated embodiment, a security association exists between the authentication server 135 and the authenticator 120 to protect communications between them. This security association can be established between the access serving network 125 and the connectivity serving network 140 based on business agreements between operators of these networks. The access serving network 125 and the connectivity serving network 140 are considered part of a trusted domain because of the security association between the authenticator 120 and the authentication server 135.

Another security association exists between the authentication server 135 and the supplicant 105. This security association is established based on the supplicant's subscription. The supplicant 105 and the connectivity serving network 140 are considered part of another trusted domain because of the security association between the supplicant 105 and the authentication server 135. The security association is established and/or maintained based upon one or more security keys. For example, if the communication system 100 operates according to the IEEE 802.16 and/or WiMAX standards, the supplicant 105 and the authentication server 135 can derive an AAA-key based on a Master Session Key (or an Extensible Master Session Key). The authentication server 135 may then populate the AAA-Key into the authenticator 120 using, for example, the RADIUS and/or DIAMETER protocols to establish the security association between the supplicant 105, the authenticator 120, and the authentication server 135. In a three party trust model, based on validation of security association between the supplicant 105 and authentication server 135, the session-limited security association is created between the supplicant 105 and access serving network authenticator 125. Parameters defining this security association, such as security keys specific to this security association, are distributed from the authentication server 135 to the authenticator 125 under protection of existing security association between the authentication server 135 and the authenticator 125.

In the illustrated embodiment, a security association created between the authenticator 120 and the supplicant 105 is represented by a pair of secret symmetric keys, one of which is stored in the authenticator 120 and one of which is stored in the supplicant 105. For example, if the communication system 100 operates according to the IEEE 802.16 and/or WiMAX standards, the supplicant 105 and the authenticator 120 each generate a copy of a Pairwise Master Key (PMK) using the AAA-key. The copies of the Pairwise Master Key may then be stored by the supplicant 105 and the authenticator 120, respectively.

The pair of secret symmetric keys can be refreshed or modified using the value of the security key used to establish the security association between the supplicant 105, the authenticator 120, and the authentication server 135. For example, if the communication system 100 operates according to the IEEE 802.16 and/or WiMAX standards, the supplicant 105 and the authenticator 120 may each modify the value of the Pairwise Master Key (PMK) using the current value of the AAA-key. Accordingly, the security association between the supplicant 105 and the access serving network 125 can be refreshed without accessing the authentication server 135 in the connectivity serving network 140.

The communication system 100 may also include one or more less trusted domains. In the illustrated embodiment, an access serving network 145 and the connectivity serving network 150 are in a less trusted domain. The access serving network 145 may include one or more base stations 155 and authenticators 160, and the connectivity serving network 150 may include its own authentication server 165. The access serving network 145 and the connectivity serving network 150 are considered to be in a less trusted domain because there is no a priori security association between the supplicant 105, the authenticator 160, and the authentication server 165. Similarly, no security association, such as the security association represented by a pair of secret symmetric keys, exists between the supplicant 105 and the authenticator 160. In one embodiment, the pair of secret symmetric keys can be refreshed or modified as discussed above before the supplicant 105 hands off to the base station 155 in the less trusted domain (as indicated by the dashed line 170). Consequently, the less trusted base station 155 receives keys derived from the newly refreshed secret symmetric key and prior values of the security keys could not be used to crypt-analyze the new keys.

Figure 2:
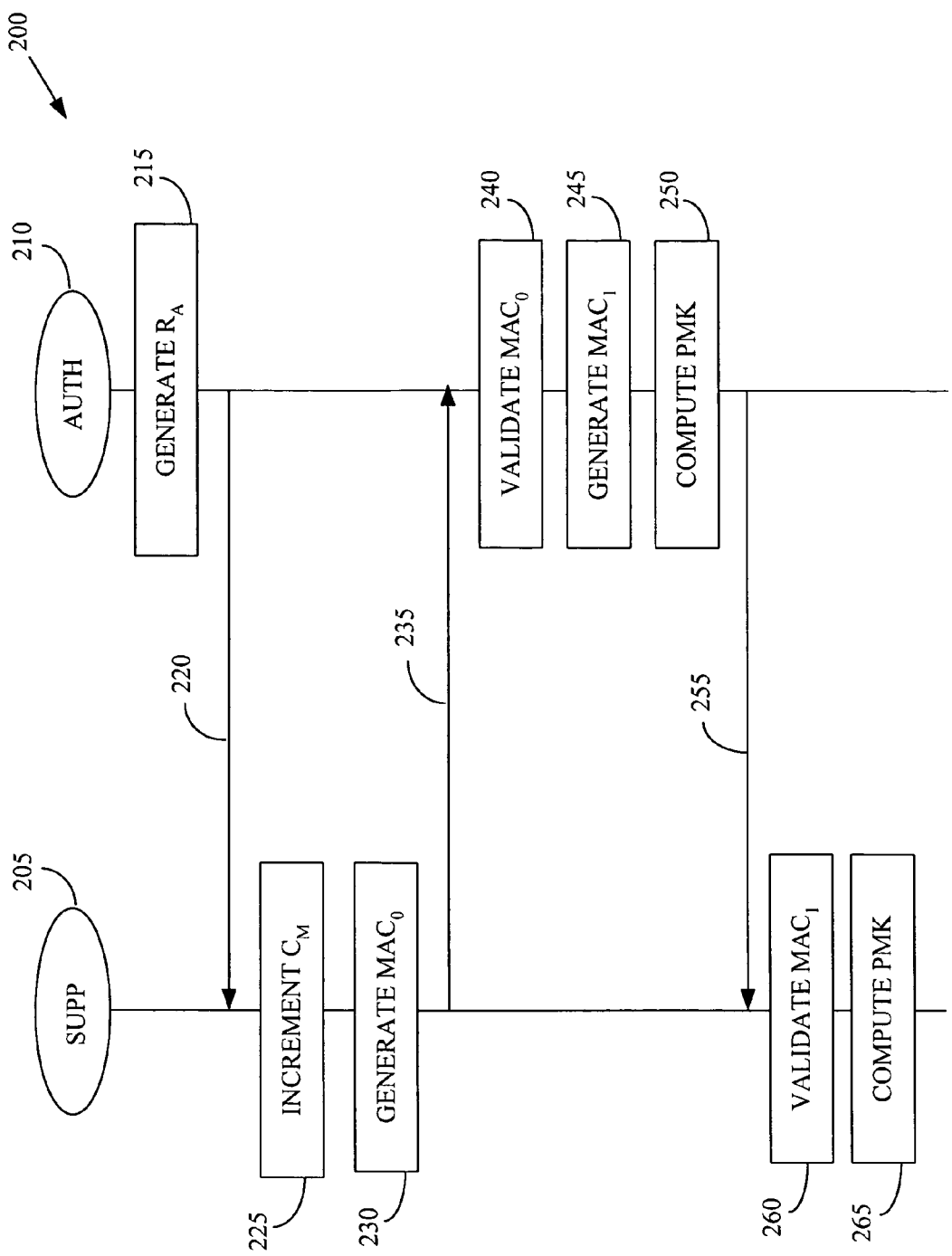
FIG. 2 conceptually illustrates one exemplary embodiment of a method of modifying secret symmetric keys based upon an existing security key, in accordance with the present invention.

FIG. 2 conceptually illustrates one exemplary embodiment of a method 200 of modifying secret symmetric keys based upon an existing security key. In the illustrated embodiment, a security association represented by a secret symmetric key exists between a supplicant 205 and an authenticator 210. The supplicant 205 and the authenticator 210 generate the secret symmetric keys using a negotiation protocol, such as a type of Bellare-Rogaway 3-step protocol. The key management negotiations between the authenticator 210 and the supplicant 205 may be used to bind the secret symmetric keys to the supplicant 205 and the authenticator 210, thereby confirming that both possess the secret symmetric keys.

The supplicant 205 and the authenticator 210 in the illustrated embodiment operate according to the IEEE 802.16 and/or WiMAX standards. However, persons of ordinary skill in the art having benefit of the present disclosure should appreciate that the present invention is not limited to the standards and, in alternative embodiment, any standard may be used. Accordingly, after successful completion of a three-party EAP Access Authentication protocol and prior to initiating the method 200, an authenticating server such as a Home AAA Server in the connectivity serving Network delivers an AAA-Key/MSK to the authenticator 210. The authenticating server also provides information that the supplicant 205 may use to derive the AAA-Key/MSK. The supplicant 205 and the authenticator 210 may then generate copies of a secret symmetric key, such as a Pairwise Master Key (PMK), from the AAA-Key, as discussed below.

In the illustrated embodiment, the method 200 is initiated by the authenticator 210, which generates a challenge such as a random number, $R_A$ (at 215). Alternatively, the authenticator 210 may generate a challenge including nonces generated by the supplicant 205 and/or the authenticator 210. A nonce is defined herein as a piece of information that is used only once, e.g., for a single authentication operation. The authenticator 210 transmits the challenge to the supplicant 205, as indicated by the arrow 220. In one embodiment, the random challenge is transmitted over the IEEE 802.16 PKMv.2 protocol. On receiving the random challenge, $R_A$, the supplicant 205 may generate a first response, which may also be called a challenge $C_M$. The challenge $C_M$ may be in a form of a random number or a counter. Alternatively, the supplicant 205 may generate a challenge including one or more nonces generated by the supplicant 205 and/or the authenticator 210. For example, the supplicant 205 may generate a first response that contains both $R_A$ and its own nonce, which may be in the form of a random number or a counter. In the illustrated embodiment, the supplicant 205 maintains a local access counter and increments (at 225) the counter $C_M$ in response to the random challenge. The supplicant 205 generates (at 230) a Message Authentication Code ($MAC_0$), which represents a response to a challenge received from the authenticator, $R_A$, and challenge maintained locally by the supplicant, $C_M$. The Message Authenticator Code $MAC_0$ is computed using a hash function:

$$MAC_0 = H(AAA\text{-Key} \| TAG_0 \| R_A \| C_M).$$

In this expression, H( ) denotes a hash function with accepted Message Authentication Code properties. Examples of such functions could be MD5, SHA-1, HMAC, EHMAC, etc. The symbol "$\|$" means concatenation. The value "$TAG_0$" is a tag identifying the process of generating the $MAC_0$ for the hash function. In various alternative embodiments, a tag may include any number of bits representative of any number and/or character string. The supplicant 205 transmits the challenge response message to the authenticator 210, as indicated by the arrow 235. In the illustrated embodiment, the challenge response message includes the $C_M$ and $MAC_0$.

The authenticator 210 validates (at 240) the challenge response using the $MAC_0$. If the authenticator 210 determines that the challenge response is valid, the authenticator 210 generates (at 245) a Message Authentication Code ($MAC_1$) based on the hash function and the AAA-key:

$$MAC_1 = H(AAA\text{-Key} \| Tag_1 \| R_A \| C_M).$$

A different tag, indicated by the value "$Tag_1$," is used to generate (at 245) the Message Authentication Code ($MAC_1$). In various alternative embodiments, a tag may include any number of bits representative of any number and/or character string. The authenticator 210 also computes (at 250) the new value of the secret symmetric key based on the hash function and the AAA-key:

$$PMK = H(AAA\text{-Key} \| Tag_2 \| R_A \| C_M).$$

The value "$Tag_2$" is a tag identifying the process of generating the PMK for the hash function. In various alternative embodiments, a tag may include any number of bits representative of any number and/or character string. The authenticator 210 transmits the $MAC_1$ to the supplicant 205 for validation, as indicated by the arrow 255.

The supplicant 205 validates (at 260) the $MAC_1$ and computes (at 265) the new value of the secret symmetric key using the expression shown above. The supplicant 205 and the authenticator 210 are mutually authenticated when the $MAC_1$ is validated (at 260). In one embodiment, additional keys, such as an Authorization Key (AK) may be generated by both the supplicant 205 and the authenticator 210. If the protocol was received uncorrupted, both sides know with cryptographic certainty that they have matching secret symmetric keys. Otherwise, if the protocol is corrupted in either direction, the corresponding party will detect this and abort the transaction.

Embodiments of the method 200 allow the security association between the supplicant 205 and the authenticator 210 to be periodically refreshed without accessing the authentication server on the subscriber's home network. For example, this protocol allows on-demand refreshment of a PMK without re-contacting the AAA Server to update the AAA-Key. Consequently, modifying the secret symmetric keys using embodiments of the present invention may consume a relatively small amount of time and other system resources when compared to the conventional three-party, four-phase authentication procedure described above. The secret symmetric keys may therefore be refreshed more often, potentially decreasing security risks associated with the communication system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of communication involving a supplicant, an authenticator, and an authentication server having an established security association based on a first key, the supplicant and the authenticator having an established security association based on a second key, the method being implemented in the authenticator and comprising:
   receiving a challenge response from the supplicant over an air interface in response to transmitting a first challenge to the supplicant over the air interface, wherein the challenge response includes a second challenge generated by the supplicant and a first message authentication code determined using the first key, the first challenge, and the second challenge;
   if the challenge response from the supplicant is valid, modifying the second key using the first key, the first challenge, and the second challenge.

2. The method of claim 1, comprising:
   transmitting the first challenge to the supplicant; and
   determining whether the challenge response is valid.

3. The method of claim 2, wherein transmitting the first challenge comprises providing a random number generated by the authenticator, and wherein the second challenge comprises at least one of a random number, a counter, and a nonce generated by the supplicant, the nonce comprising at least one of a random number and a counter.

4. The method of claim 3, wherein determining that the challenge response is valid comprises validating the first message authentication code.

5. The method of claim 4, comprising generating a second message authentication code using the first key, the first challenge, and the second challenge.

6. The method of claim 5, comprising transmitting the second message authentication code to the supplicant over the air interface.

7. The method of claim 6, wherein modifying the second key comprises determining the second key using a hash function of the first key, the first challenge, and the second challenge.

8. The method of claim 7, comprising:
   receiving an indication that the second message authentication code was validated by the supplicant.

9. The method of claim 1, comprising determining at least one third key based upon the modified second key.

10. A method of communication involving a supplicant, an authenticator, and an authentication server having an established security association based on a first key, the supplicant and the authenticator having an established security association based on a second key, the method being implemented in the supplicant and comprising:
    transmitting a challenge response to the authenticator over an air interface in response to receiving a first challenge from the authenticator over the air interface, wherein the challenge response includes a second challenge generated by the supplicant and a first message authentication code determined using the first key, the first challenge, and the second challenge;
    receiving a second message authentication code from the authenticator over the air interface;
    if the second message authentication code is validated, modifying the second key using the first key, the first challenge, and the second challenge.

11. The method of claim 10, comprising receiving the first challenge from the authenticator.

12. The method of claim 11, wherein receiving the first challenge comprises receiving a random number generated by the authenticator, and wherein the second challenge comprises at least one of a random number, a counter, and a nonce generated by the supplicant, the nonce comprising at least one of a random number and a counter.

13. The method of claim 12, comprising validating the second message authentication code.

14. The method of claim 13, wherein receiving the second message authentication code comprises receiving a second message authentication code generated by the authenticator using the first key, the first challenge, and the second challenge.

15. The method of claim 14, wherein modifying the second key comprises determining the second key using a hash function of the first key, the first challenge, and the second challenge.

16. The method of claim 10, comprising determining at least one third key based upon the modified second key.

* * * * *

UNITED STATES PATENT AND TRADEMARK OFFICE
CERTIFICATE OF CORRECTION

PATENT NO.       : 7,596,225 B2                                            Page 1 of 1
APPLICATION NO.  : 11/173143
DATED            : September 29, 2009
INVENTOR(S)      : Mizikovsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1126 days.

Signed and Sealed this

Twenty-eighth Day of September, 2010

David J. Kappos
*Director of the United States Patent and Trademark Office*